United States Patent [19]
Bailey

[11] Patent Number: 4,838,948
[45] Date of Patent: Jun. 13, 1989

[54] PROCESS FOR CLEANING POLYMER PROCESSING EQUIPMENT

[75] Inventor: Fay W. Bailey, Bartlesville, Okla.

[73] Assignee: Phillips Petroleum Company, Bartlesville, Okla.

[21] Appl. No.: 78,338

[22] Filed: Jul. 27, 1987

[51] Int. Cl.$^4$ .............................................. B08B 9/04
[52] U.S. Cl. .......................................... 134/8; 134/7; 134/9; 134/22.14; 252/174.23; 252/554; 252/555; 252/558; 252/174.25; 524/158
[58] Field of Search ................... 252/539, 174.23, 535, 252/537, 174.25; 524/157, 158; 134/7, 8, 9, 22.12, 22.14, 22.18

[56] References Cited

U.S. PATENT DOCUMENTS

| | | | |
|---|---|---|---|
| 3,071,498 | 1/1963 | Kaskel | 252/174.13 |
| 3,476,599 | 11/1969 | Grover et al. | 134/4 |
| 3,776,774 | 12/1973 | Miller | 134/7 |
| 3,985,668 | 10/1976 | Hartman | 252/99 |
| 4,116,851 | 9/1978 | Rupe et al. | 252/103 |
| 4,240,919 | 12/1980 | Chapman | 252/95 |
| 4,289,640 | 9/1981 | Falivene | 252/95 |
| 4,606,850 | 8/1986 | Malik | 252/528 |

Primary Examiner—Prince E. Willis
Assistant Examiner—John F. McNally
Attorney, Agent, or Firm—Hal B. Woodrow

[57] ABSTRACT

The present invention pertains to a process for cleaning polymeric processing equipment. The process comprises purging the polymer processing equipment with a composition comprising a polymer, a mild abrasive and a sulfonated surfactant.

2 Claims, No Drawings

PROCESS FOR CLEANING POLYMER PROCESSING EQUIPMENT

The present invention pertains to a method for cleaning polymeric processing equipment. Another aspect of the invention pertains to a composition which is useful in cleaning polymeric processing equipment.

A variety of additives such as silicones, antioxidants, pigments, etc. are routinely incorporated into polymeric compositions in order to enhance the performance of the polymer. Unfortunately, many of these additives can leave residual films upon the metal surfaces of the polymeric processing equipment.

These films can have adverse affects upon subsequent polymeric compositions which are processed in this equipment. This is especially applicable if the polymeric composition is of a different nature from that which left the residual film.

In order to avoid these problems, it is necessary to subject the polymeric processing equipment to periodic cleanings.

Various approaches have been utilized to clean this equipment but none have been entirely adequate.

One solution has been to dismantle the equipment and subject it to cleaning with an abrasive. This method suffers from the disadvantages of being time consuming, and labor intensive.

Another approach is to purge the polymeric processing equipment with a polymer for a period of time up to 8 hours. This method also suffers from the disadvantage of being time consuming. Another disadvantage of this method is that it is wasteful of polymer. The purged polymer is routinely discarded due to the contaminants it contains.

Thus, it would be a valuable contribution to the art to develop a process for cleaning the metal surface of polymeric processing equipment which would be neither time consuming nor wasteful of polymer.

It is an object of the present invention to provide a process for cleaning the metal surfaces of polymeric processing equipment which is neither wasteful of polymer nor time consuming.

It is a further object of the present invention to provide compositions which are useful for cleaning the metal surfaces of polymeric processing equipment.

Other aspects, objects, and advantages of the present invention will become apparent hereinafter.

In accordance with the present invention, it has been discovered that when polymeric processing equipment is being cleaned by purging with a polymeric composition; it is possible to improve the efficiency of the purging operation by utilizating a polymeric composition comprising a polymer, a mild abrasive, and a sulfonated surfactant.

As noted supra, a common method of removing the residual films that polymeric additives often leave upon the metal surfaces of polymeric processing equipment, is to flush or purge the equipment with a flux polymer. This is accomplished by charging the equipment with a polymer and continually processing the polymer for a period of time sufficient to allow the polymer to flush away the residual contaminants and additives adhered to the metal surfaces.

The present invention is an improvement of that process. It has been discovered that incorporation of a mild abrasive and a sulfonated surfactant into the flux polymer results in a polymeric composition which when utilized to purge equipment of residual contaminants and additives significantly reduces both the time and the amount of polymer otherwise required.

The process of the present invention is useful for removing a wide variety of contaminants and residual additives from the metal surfaces of polymer processing equipment.

The process of the present invention can be carried out with a wide variety of polymeric processing equipment. Representative examples include screw and ram extruder, injection molding machines, continuous mixers, banbury mixers, sigma blade mixers, and the like. As long as the polymeric processing equipment utilizes a flux polymer, the process of the present invention can be utilized to clean that equipment.

As known to those skilled in the art, a wide variety of polymeric materials can be utilized in purging operations. Any polymeric material capable of flowing under shear stress is suitable for practice with the present invention. Representative examples of polymeric materials which can be utilized in the purging operations of the present invention are those selected from the group consisting of homopolymers of $\alpha$-olefins, copolymers of $\alpha$-olefins, homopolymers of conjugated dienes, homopolymers of monovinyl arenes, copolymers of conjugated dienes and monovinyl arenes, homopolymer of polyamides, copolymers of polyamides, homopolymers of polyphenylene sulfide, copolymers of polyphenylene sulfide, fluoroplastics and acrylic resins.

The mild abrasive suitable for use in the present invention is at least one abrasive selected from the group consisting of calcium carbonate, calcium phosphate, calcium silicate, and aluminum silicate. Calcium carbonate is presently preferred.

The sulfonated surfactant suitable for use in the present invention is at least one surfactant selected from the group consisting of (a) alkyl sulfonates of the formula $RSO_3^- M^+$, wherein R is selected from the group consisting of alkyl groups containing from 8 to 20 carbon atoms and M is selected from the group consisting of sodium, calcium and lithium;

(b) alkyl benzyl sulfonates of the formula $RC_6H_4SO_3^- M^+$, wherein R is selected from the group consisting of alkyl groups containing from 8 to 20 carbon atoms and M is selected from the group consiting of sodium, calcium and lithium; and (c) $\alpha$-olefin-sulfonates of the formula $RCH=CHSO_3^- M^+$, wherein R is selected from the group consisting of alkyl groups containing from 6 to 18 carbon atoms.

The presently preferred sulfonated surfactants are alkyl sulfonates of the formula $RSO_3^- M^+$, wherein R is selected from the group consisting of alkyl groups containing from 8 to 20 carbon atoms and M is selected from the group consisting of sodium, calcium, and lithium.

It is presently preferred for the constituents of the purging composition of the present invention to be present in the following quantities:

TABLE I

|  | Broad Range | Preferred Range |
| --- | --- | --- |
| (a) Polymer | 92–97.4 | 95.5–96.6 |
| (b) Mild Abrasive | 2.4–6.4 | 3.2–4 |
| (c) Sulfonated Surfactant | 0.2–1.6 | 0.2–0.5 |

The composition of the present invention can be formulated by dry blending the constituents together on a drum tumbler or any other mixer conventionally used within the plastics industry.

A preferred manner of formulating the purging composition of the present invention is to utilize a commercial cleansing composition which contains an abrasive and a sulfonated detergent and incorporating this commercial cleaning compound directly into the polymer by dry blending as described above. The preferred cleaning composition currently is Bon Ami brand cleanser available from the Faultless Bon Ami Company of Kansas City, Mo.

In order to provide a clearer understanding of the present invention, but without limiting the scope thereof, the following examples are presented herewith.

EXAMPLE I

The purpose of this example is to demonstrate a method for preparing the composition of the present invention.

66 lbs. of a high density polyethylene polymer[1] and 42 oz. of a commercially available cleaning composition[2] were placed in a drum tumbler. These constituents were then mixed for 10 minutes at 60 rpm.

[1] A polymeric composition prepared by Phillips Petroleum Company having a density at 0.954 gm/cc as calculated by ASTM-D-1505, 1985; a high load melt index of 11.0 gm/cc minutes and a melt index of 0.10 gm/10 minutes as calculated by ASTM-D-1238, 1985.
[2] Bon Ami Cleanser—commercially available from the Faultless Starch -Bon Ami Company of Kansas City, Mo.

EXAMPLE II

The purpose of this example is to compare a purging process utilizing a flux polymer alone, and a purging process utilizing the flux polymeric composition of the present invention.

A one and one-half inch extruder commercially available from the Davis Standard Company as Model Number 150S was used for the comparative test. On two separate occasions, the extruder had been utilized to process identical fluroelastomer copolymers for approximately 8 hours. On both occasions the extruder had been operated at 115 rpm and at a temperature of 221° C. Thus, on both occasions the metal surfaces of the extruder had been contaminated by comparable levels of residual additives.

After one of the processing periods, the extruder was cleaned by purging it with the polymeric composition prepared in Example I. This was accomplished by loading the hopper with the composition and processing it through the extruder at 115 rpm and at an operating temperature of 221° C. As the polymer exited the extruder, it was visually inspected for signs of contamination by the residual additives left by the fluroelastomer polymers. After 22 minutes of purging, there were no longer any signs of contamination. Approximately 22 pounds of the inventive composition was utilized.

After the other processing period, the extruder was cleaned by purging it with an additive free high density polyethylene polymer, identical to that used in compounding the inventive composition. This was also accomplished by loading the hopper with the polymer and processing it through the extruder at 115 rpm and at an operating temperature of 221° C. As in the previous purging, the polymer was visually inspected for signs of contamination as it exited the extruder. After 8 hous of purging, these signs of contamination ceased. 240 pounds of polyethylene were consumed during this purging operation.

This example shows that purging conducted with the polymeric composition of the present invention was completed in approximately 10 percent of the time required by a similar operation utilizing the unmodified polymer alone. There was also approximately a 90 percent reduction in the amount of polymer needed for the cleaning.

Accordingly, the above data shows that purging conducted with the composition of the present invention both reduces the time required to conduct the cleaning and the amount of polymer required for the cleaning.

Reasonable variations can be made in view of the foregoing disclosure without departing from the spirit and scope of the invention.

That which is claimed is:

1. In a process for cleaning polymeric processing equipment by purging with a flux polymeric composition; the improvement which comprises conducting said purging with a polymeric purging composition which further comprises:
  (a) from 92–97.4 weight percent of a polymeric composition, wherein said polymeric composition, is selected from the group consisting of homopolymers of α-olefins, copolymers of α-olefins, homopolymers of conjugated dienes, homopolymers of monovinyl arenes, copolymers of conjugated dienes and monovinyl arenes, homopolymers of polyamides, copolymers of polyamides, homopolymers of polyphenylene sulfide, copolymers of polyphenylene sulfide, fluoroplastics and acrylic resins;
  (b) from 2.4–6.4 weight percent of a mild abrasive, wherein said mild abrasive is selected from the group consisting of calcium carbonate, calcium phosphate, calcium silicate and aluminum silicate; and
  (c) from 0.2 to 1.6 weight percent of a sulfonated surfactant, wherein said sulfonated surfactant is selected from the group consisting of:
    (1) alkyl sulfonates of the formula $RSO_3^- M^+$, wherein R is selected from the group consisting of alkyl groups containing from 8 to 20 carbon atoms and M is selected from the group consisting of sodium, calcium and lithium;
    (2) alkyl benzyl sulfonates of the formula $RC_6H_4SO_3^- M^+$, wherein R is selected from the group consisting of alkyl groups containing from 8 to 20 carbon atoms and M is selected from the group consisting of sodium, calcium and lithium; and
    (3) α-olefin-sulfonates of the formula $RCH=CHSO_3^- M^+$, wherein R is selected from the group consisting of alkyl groups containing from 6 to 18 carbon atoms.

2. The process of claim 1, wherein
  (a) said mild abrasive is calcium carbonate;
  (b) said sulfonated surfactant is an alkyl sulfonate of the formula $RSO_3^- M^+$, wherein R is selected from the group consisting of alkyl groups containing from 8 to 20 carbon atoms and M is selected from the group consisting of sodium, calcium and lithium; and
  (c) said polymer is polyethylene, wherein said polyethylene has a density of 0.954 gm/cc, a high load melt index of 11.0 gm/10 minutes, and a melt index of 0.10 gm/10 minutes.

* * * * *